Oct. 26, 1948.　　　　R. T. SAND　　　　2,452,327
MULTIPURPOSE LIGHT
Filed July 2, 1945　　　　　　　　　　　2 Sheets—Sheet 1
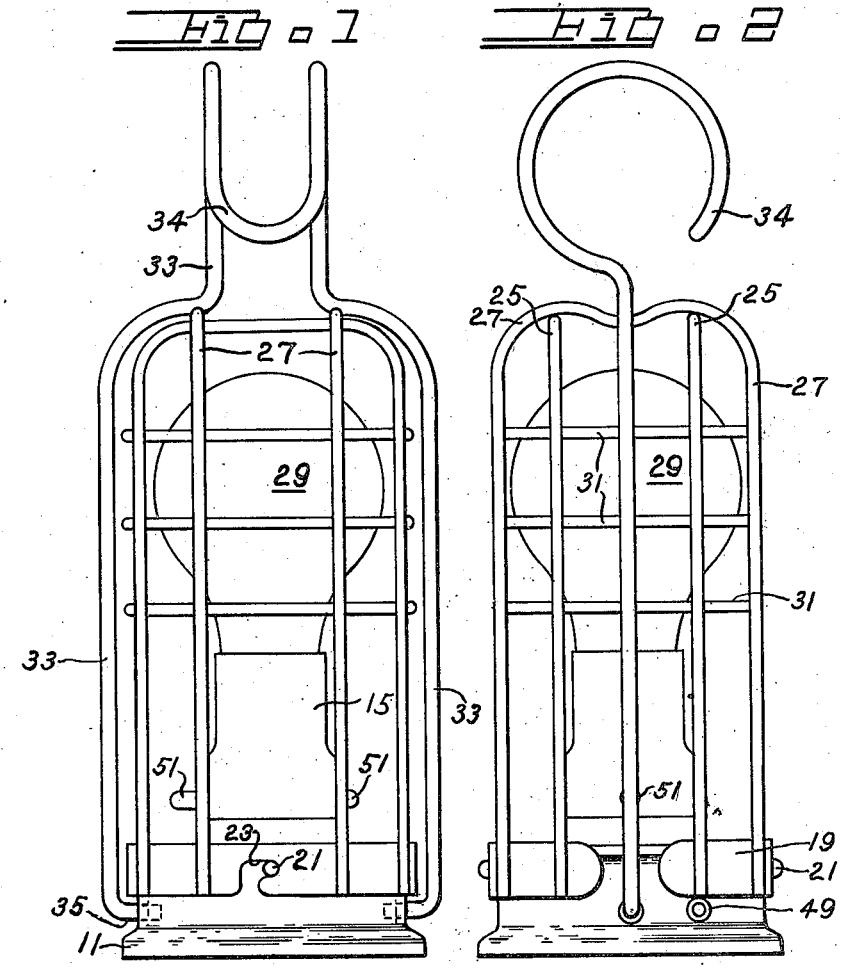
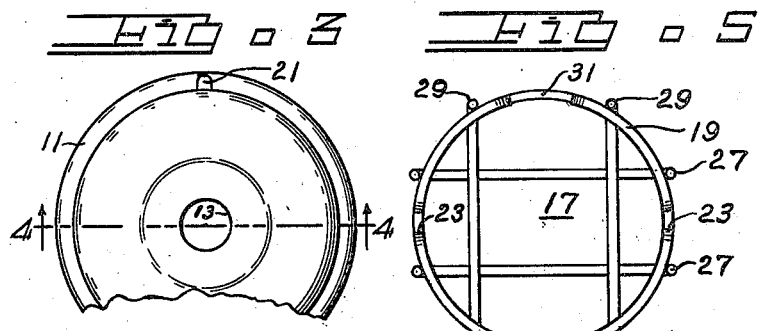
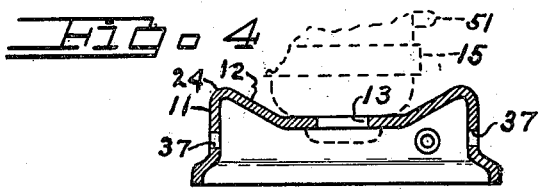
INVENTOR
Robert T. Sand
BY
T. T. Hicks
ATTORNEY

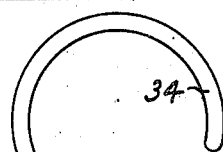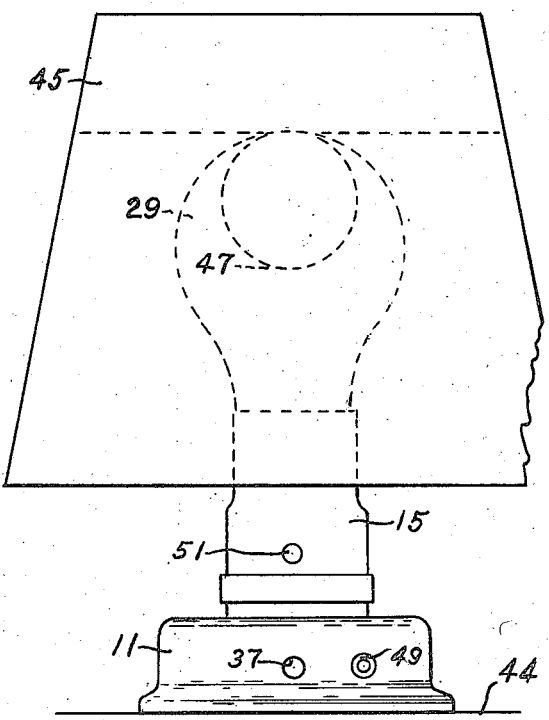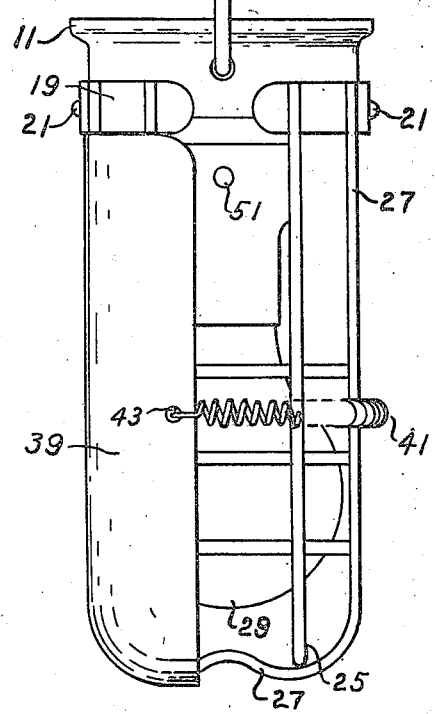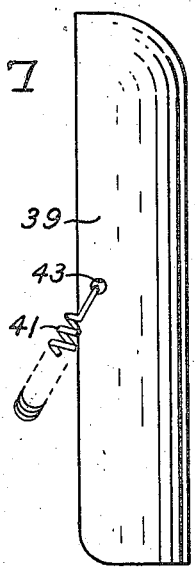

Patented Oct. 26, 1948

2,452,327

UNITED STATES PATENT OFFICE 2,452,327

MULTIPURPOSE LIGHT

Robert T. Sand, Detroit, Mich., assignor of forty per cent to Frederick T. Hicks, Detroit, Mich.

Application July 2, 1945, Serial No. 602,709

3 Claims. (Cl. 240—11.2)

My invention pertains to an electric lamp and more particularly to a multi-purpose utility light.

It is an object of my invention to provide an electric lamp of a simple rugged construction which may be very conveniently arranged for utilization to serve a great many different purposes.

It is also an object of my invention to provide a multi-purpose electric light comprising a few simple parts which may be quickly and conveniently assembled or disassembled to produce a variety of cooperative assemblages for various uses as desired.

It is a further object of my invention to provide such a multi-purpose light which may be readily adapted for use as a suspension light either upright or depending, and either with or without a reflector, or which may be used as a table light.

Another object of my invention is to provide a multi-purpose light comprising a base, a lamp guard, a handle or suspension hook and a reflector disposable in various different useful combinations, as desired.

Further objects and advantages are within the scope of the invention, such as relate to the arrangement, operation and function of the related elements of the structure to various details of construction and to combinations of parts, elements per se, and to economies of manufacture and numerous other features as will be apparent from a consideration of the specification in conjunction with the drawings disclosing a specific embodiment of the invention, in which:

Fig. 1 is a side elevational view showing my multi-purpose light arranged for use as an upright suspension light;

Fig. 2 is a similar view at right angles to Fig. 1;

Fig. 3 is a plan view of the base member, per se, partially broken away;

Fig. 4 is a cross-sectional view on line 4—4 in Fig. 3;

Fig. 5 is a bottom plan view of the lamp guard cage, per se;

Fig. 6 is a side elevational view of the lamp turned for suspension downwardly from the hook, the reflector being applied;

Fig. 7 is a side elevational view of the reflector element, per se; and

Fig. 8 is a side elevational view, partially broken away, showing the light arranged as a table lamp.

Referring more specifically to Figs. 1 through 5, of the drawings, I have illustratively disclosed my multi-purpose light comprising a base 11 of dished or inverted bowl shape having a concave upper surface 12 suitably conformed to serve as a reflector. The base is provided with an aperture 13 centrally disposed therein for mounting a conventional lamp socket 15, as represented in dotted lines partly broken away in Fig. 4. A lamp guard cage 17 is provided having a broken clamping ring 19 which fits snugly and resiliently down over the down turned outside walls of the base. To firmly lock and secure the lamp guard, the base is provided with a plurality of outwardly projecting pins 21 and the ring 19 is provided with corresponding L-shaped slots 23 for fitting over the pins upon which the ring may be locked by a slight turn. To guide the ring 19 smoothly, when it is being installed, the upper edges of the base sidewalls are turned in with a smoothly rounded surface 24.

The lamp guard cage 17 is formed by providing a pair of U-shaped wire guards 25 secured at the open ends to the clamp ring 19 and rising therefrom in a parallel spaced relation. A second pair of U-shaped guards 27 are also provided rising from the ring in a relatively spaced parallel relation and crossing over the tops of the other guards 25 at right angles with the central or intermediate top portions dipping slightly therebetween. To further protect the lamp 29 in the socket, a plurality of guard rings 31 are provided spaced apart in horizontal planes and contacting around inside of the side bars of the U-shaped guards 25 and 27. These guard rings 31 are secured to the guards 25 and 27, and the latter are secured to the clamp ring 19 in any suitable manner, as by welding.

A handle or support bail 33 is provided having inturned ends 35 for engaging and pivotally attaching into the sidewalls of the base at diametrically opposed points, where apertures 37 may be provided. The swinging end of the bail 33 turns in over the lamp guard and is shaped suitably to form a hook 34 by which the light may be conveniently suspended from any convenient support such as a tree branch, rope, rod or the like. The side members of the handle 33 being spaced apart in the hook 34 provide a two point support to minimize swinging of the light when it is so suspended. The portion of the bail 33 turned over the lamp guard is shaped to fit so closely that it may be turned to hold upon the top of the lamp guard to hold the light upright, as shown in Figs. 1 and 2, or the lamp guard may be turned therethrough and to a suspended downward position, as shown in Fig. 6. In the latter position, the concave surface 12 serves to reflect light downwardly. The resilience of the handle bail 33 permits this and also snapping it into or from the base.

A reflector 39 is provided which is suitably curved to fit partially around one side of the lamp guard cage, as shown in Fig. 6. A small tension spring 41 is secured at opposite ends between holes 43 in opposite sides of the reflector so that it may be pulled snugly over the lamp cage to quickly and conveniently apply the reflector thereon.

To adapt the light for use as an improvised table or bench lamp to stand upright upon a table surface 44, the bail 33 and also the lamp guard cage may be quickly removed from the base 11 which may be stood upon a table, as shown in Fig. 8. If desired, a lamp shade 45 of a well known type may be provided supported upon the upper part of the lamp bulb 29 by means of the usual ring clamps 47, represented dotted. An insulation bushing 49 may be provided in the sidewall of the base for passing a conventional service cord from the socket to a suitable source of electric energy (not shown). The lamp socket 15 is preferably a conventional type having a pushbutton 51 for conveniently actuating an enclosed lamp switch, in a well known manner. Although it is possible to utilize various suitable materials, it is preferable to make the base 11 and also other elements of my multi-purpose light of a bright metal, such as stainless steel, to provide good light reflecting and non-corrodible surfaces. It may be made of a size suitable for receiving the conventional incandescent light bulbs, and any of these various different adaptations may be quickly and conveniently provided to suit different conditions of use without working with nuts, bolts, screws or tools. Also my improved lamp, assembled as shown in Figs. 1, 2 and 3 may be laid upon its side for use in tight spots and corners.

It is apparent that within the scope of my invention modifications and different arrangements may be made other than herein disclosed, the present disclosure being illustrative merely, the invention comprehending variations thereof.

I claim:

1. A multi-purpose light comprising, a base dished to constitute a reflector and to contain an electric light socket and having outwardly exposed sidewalls, a lamp guard cage having a top portion and having a lower portion adapted to clamp around the sidewalls of said base for protecting a lamp in the socket, and means to lock the cage to the base comprising a handle bail having bottom ends pivotally mounted in the base and straight sides with a top portion having shoulders, the bail being swingable to bring the shoulders into snug engagement with the top of the cage.

2. A multiple-purpose electric light in accordance with claim 1, in which the lower portion of the lamp guard cage comprises a resilient ring adapted to fit around the sidewalls, the lamp base and the cage ring having means for positioning and holding the ring comprising co-operating pin and recess portions, the bail handle shoulders being positioned thereby to swing into snug fitting engagement with the cage top.

3. A multiple-purpose electric light in accordance with claim 1, comprising means to prevent the guard cage from shifting in which the cage top contains a depressed portion, and the cage contains means to position the depressed portion of the cage at an angle to the bail, and a bail shoulder conformed to spring snugly into the guard depression when the shoulder is swung into engagement with the top of the cage.

ROBERT T. SAND.

REFERENCES CITED

The following references are of record in the file of this patent:

UNITED STATES PATENTS

| Number | Name | Date |
| --- | --- | --- |
| 582,838 | Wilson | May 18, 1897 |
| 641,221 | Pittman | Jan. 9, 1900 |
| 1,315,494 | Heinrich | Sept. 9, 1919 |
| 1,382,800 | Purple | June 28, 1921 |
| 1,670,566 | Brown | May 22, 1928 |
| 1,705,239 | DeLorme | Mar. 12, 1929 |
| 2,157,738 | Kollath | May 9, 1939 |
| 2,225,391 | Pierce | Dec. 17, 1940 |
| 2,318,329 | Popp | May 4, 1943 |
| 2,363,088 | Sand | Nov. 21, 1944 |